United States Patent Office 2,989,150
Patented June 20, 1961

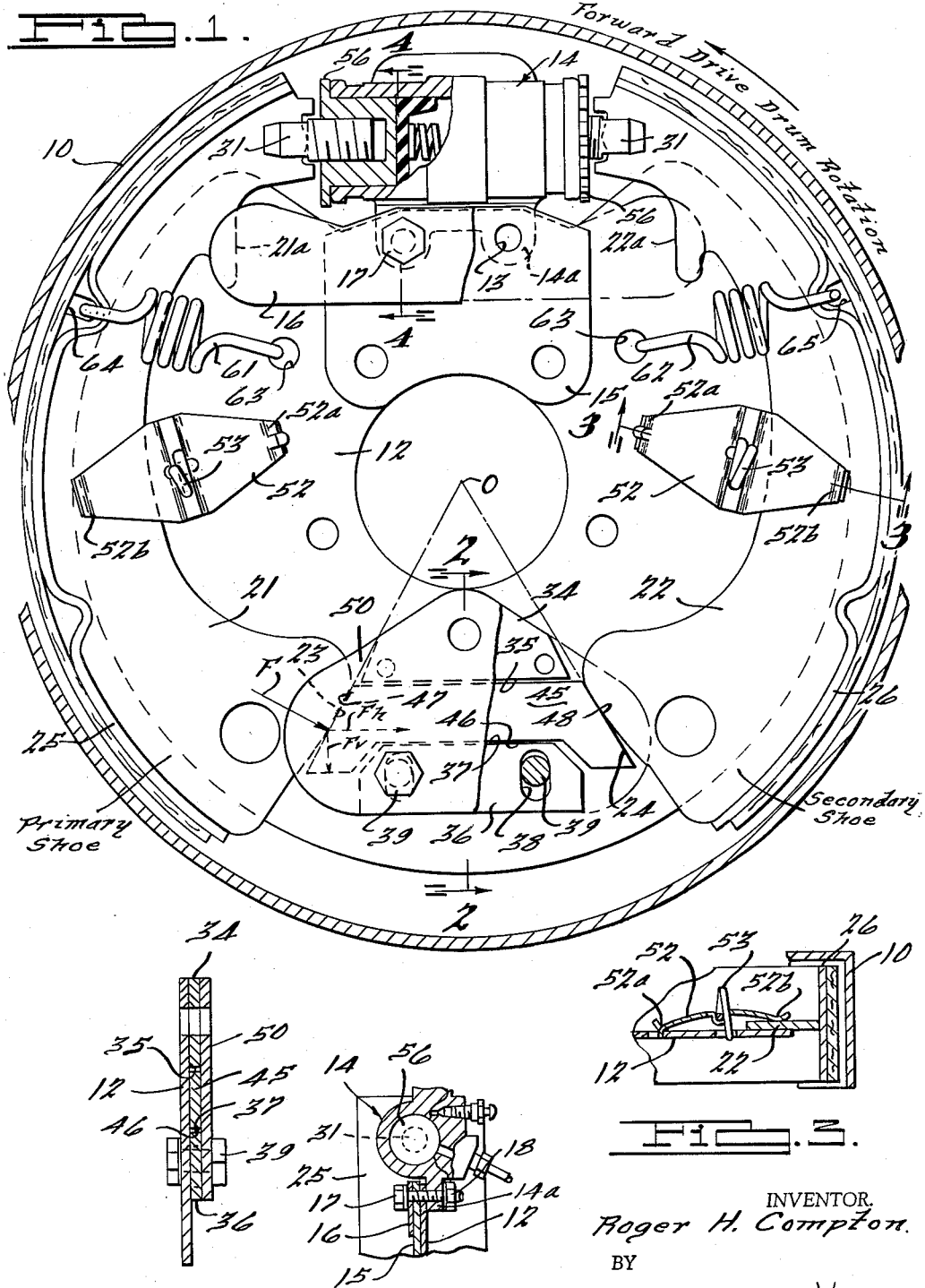

2,989,150
SHIFTABLE ANCHOR FLOATING SHOE BRAKE
Roger H. Compton, Inkster, Mich., assignor to Chrysler Corporation, Highland Park, Mich., a corporation of Delaware
Filed Mar. 18, 1957, Ser. No. 646,832
4 Claims. (Cl. 188—78)

This invention relates to friction brake assemblies of the type having self-adjusting, self-energizing, floating brake shoes which are adapted to be expanded into engagement with the encircling flange portion of a rotatable brake drum. This invention concerns particularly a floating shoe brake having a shiftable anchor plate that interconnects the primary and secondary brake shoes and wherein friction means are included to control the amount of servo or self-energizing braking force transmitted from the primary shoe to the secondary brake shoe during a braking operation.

It is a primary object of this invention to provide an improved and simplified form of brake assembly composed primarily of stamped elements which elements are arranged in such a manner that the brake shoes and the actuating mechanism therefor are centered with respect to the members taking the brake reaction.

It is a further object of this invention to provide a floating shoe brake having primary and secondary shoes that are interconnected by a shiftable anchor link or anchor plate that has means associated therewith to control the degree or amount of self-energizing braking force transmitted from the primary shoe to the secondary shoe during a braking operation.

It is a still further object of this invention to provide a floating shoe brake having a shiftable anchor plate or anchor link connected between the primary and secondary shoes including control means for the transmission of self-energizing forces between the shoes and wherein the anchor link or plate includes ramp surfaces engageable by the brake shoes, the angularity of which may be varied to give a proper balance between primary and secondary brake shoe torque.

It is an additional object of this invention to provide a brake assembly in which the number of required elements has been reduced to a minimum and the required elements simplified in design so that they may be formed primarily from relatively light weight, symmetrically shaped, stampings. Such a construction makes this brake assembly one that is economical to manufacture and install, yet highly efficient as to braking action, and extremely durable in service.

It is an additional object of this invention to provide a multi-shoe brake assembly in which the several shoes can each independently adjust themselves to maintain a match of shoe shape to drum distortion during braking such that there will be total contact between the shoe braking surface and the drum brake surface.

It is another object of this invention to provide a brake assembly in which the movable brake shoes are positively guided during all movement and retained in their most efficient braking position during brake application.

Additional objects and advantages of this invention will be apparent from a reading of the attached specification and a consideration of the related drawings wherein:

FIGURE 1 is a side elevational view of a front wheel brake assembly embodying this invention with certain parts thereof shown in section;

FIGURE 2 is a sectional elevational view of the brake assembly shown in FIGURE 1, the view being taken along the line 2—2 of FIGURE 1 looking in the direction of the arrows;

FIGURE 3 is a fragmentary sectional elevational view of portions of the brake assembly shown in FIGURE 1, the view being taken along the line 3—3 of FIGURE 1 looking in the direction of the arrows; and FIGURE 4 is another fragmentary sectional elevational view of portions of the brake assembly shown in FIGURE 1, the view being taken along the line 4—4 of FIGURE 1 looking in the direction of the arrows.

Referring to the drawings in detail, the brake assembly embodying my invention includes an annular brake drum 10 which is adapted to be secured to the rotatable member to be braked, such as the road wheel of a motor vehicle. Numeral 12 designates the support or reaction plate for the brake assembly and it is adapted to be mounted on a relatively fixed supporting member such as the rear axle housing or the front wheel steering knuckle of a vehicle chassis, depending on whether the brake assembly is for the vehicle rear wheel or front wheel respectively. Plate 12 supports the brake shoe actuating mechanism 14 thus it provides the means for taking the brake reaction between the brake shoes 21, 22 and the brake drum 10. The support plate 12 is adapted to mount a double piston, fluid pressure operated, brake shoe actuating motor 14 which is of conventional design. Plate 12 is provided with a pair of bolt receiving openings 13 that are adapted to be aligned with a pair of bolt receiving openings in the ears 14a of the shoe actuating motor casing. The motor casing ears 14a are offset (see FIG. 4) from the center plane of the motor cylinders and are adapted to be positioned against the back face of the support plate 12. Mounted on the front face of support plate 12 is a spacer plate 15 that also has a pair of bolt receiving openings therein that are adapted to be aligned with the bolt openings in the motor casing ears 14a. Arranged to overlie the spacer plate 15 is a brake shoe guide plate 16. Guide plate 16 also has a pair of bolt receiving openings therein that are adapted to be aligned with the bolt receiving openings in the motor casing ears 14a. Bolts 17 extend through the aligned bolt receiving openings in the motor ears 14a, the support plate 12, the spacer plate 15 and the shoe guide plate 16 to hold these elements in assembled positions.

When the nuts 18 are threaded on the threaded end of the bolts 17 then the shoe actuating motor 14 is anchored to support plate 12 and a rigid assembly is provided for guiding the toe ends of the primary and secondary brake shoes 21, 22 respectively. As the centrally arranged web portions of the brake shoes 21 and 22 and the thrust links 31 of the actuating motor 14 are all arranged with their force transmitting portions positioned centrally between the support plate 12 and the guide plate 16, an arrangement is provided in which there is little chance for the development during braking of torsional loads or bending moments that would tend to tilt or cock the brake shoes and thereby increase the stress concentrations in the various elements of the brake assembly. This balanced mounting of the brake shoes and the brake shoe actuating mechanism is commonly referred to in the brake field as a center plane brake construction and it has the advantage of tending to utilize the maximum braking surface for braking so as to keep unit brake pressures to a minimum.

Mounted on the support plate 12, at a position substantially diametrically opposed to the brake shoe actuating motor 14, is the shiftable anchor plate assembly that constitutes a major part of this invention. Rigidly secured to the front face of the support plate 12 is a fixed spacer plate 34 that has a lower edge 35 that is adapted to form one side of the anchor link guide channel to be subsequently described. Also secured to the front face of the support plate 12 is an adjustable spacer plate 36. Adjustable spacer plate 36 has a pair of elongated slots 38 formed therein that are adapted to receive the shank portions of the mounting bolts 39. The upper edge 37 of the adjustable spacer plate 36 provides a second side of the channel that is adapted to receive the shiftable brake shoe anchor link 45.

Anchor link 45 is adapted to seat in and shift lengthwise in the channel formed between the edges 35 and 37 of the spacer plates 34 and 36 respectively. The opposite ends 47 and 48 of the anchor link 45 are substantially radially extending with respect to the center of the support plate 12 and these end surfaces 47, 48 provide ramp surfaces along which the heel ends 23 and 24 of the brake shoes 21, 22 shift and seat.

Mounted on and overlying the spacer plates 34, 36 is a brake shoe guide plate 50. Guide plate 50 not only provides a cover for the anchor link channel between the spacer plates 34, 36 but it also extends beyond the ends of the anchor link 45 so that it cooperates with the support plate 12 to provide a pair of slots that guidingly receive the heel ends of the brake shoe web portions. With the arrangement described it is obvious that there is little chance for cocking of the brake shoes 21, 22 because the toe ends of the shoe web portions are guidingly received in the slots between the guide plate 16 and the support plate 12 while the heel ends of the shoe web portions are guidingly received in the slots between the guide plate 50 and the support plate 12. The bolts 39 that extend through the support plate 12, the spacer plate 36 and the guide plate 50 lock these elements into a rigid shoe anchor assembly. The bolts 39 also cooperate with the slots 38 in spacer plate 36 to provide an adjusting mechanism for controlling the clearances between the edge 46 of shiftable anchor link 45 and the edge 37 of spacer plate 36. Control of this clearance effects the action of this brake assembly as will be subsequently explained.

To further assist in guiding the brake shoe web portions, there is provided intermediate the toe and heel ends of each shoe a dished spring-pressed clip 52. Clips 52 have their inner ends 52a bearing on the support plate 12 while these outer ends 52b bear on the associated brake shoe web portion. A spring connector 53 extending between each clip 52 and the underlying support plate 12 presses the associated brake shoe web portion against the support plate and this guides the brake shoe as well as providing a brake shoe noise damper mechanism. Spring clips 52 form no part of this invention as they have been previously disclosed in the pending patent application of Robert F. Smith, Serial No. 367,023, filed July 9, 1953, now U.S. Patent No. 2,828,834.

Movably mounted on the support plate member 12 and extending between the motor actuated links 31 and the anchor link 45 are the webs of the pair of identical, arcuately shaped brake shoes 21, 22. Each shoe has a lined peripheral rim or table flange 25 or 26 that is adapted to be frictionally engaged with the inner axially extending, cylindrical braking surface of the brake drum 10. Each shoe has its web portion extending centrally of the width of the shoe rim and normal thereto. The toe end portion of each shoe web is adapted to be connected to the shoe actuating thrust link 31 as shown in FIG. 1. It will be noted that the thrust links 31 are threadably engaged with collars 56 that form part of the pistons of the shoe actuating motor means 14. By rotation of the notched collars 56 on the threaded thrust links 31, the normal clearance between the brake drum 10 and the lined rims 25, 26 of the brake shoes 21, 22 respectively, can be adjusted. In the alternative, adjusting cams, rotatably mounted on the support plate 12 and engageable with the fingers 21a and 22a of the brake shoes 21, 22 respectively, could be used to adjust the normal clearance between the brake shoes 21, 22 and the surrounding brake drum 10. The use of rotatable cams for adjusting shoes of the disclosed type is clearly shown in the aforementioned pending patent application of Robert F. Smith, Serial No. 367,023, filed July 9, 1953, now U.S. Patent No. 2,828,834. This cam adjustment is not a part of this invention.

To maintain the brake shoes 21, 22 in their normal positions and to retract the expanded brake shoes when braking pressure is relieved, the brake assembly is provided with a pair of brake shoe return springs 61, 62. Each of springs 61, 62 has one end anchored in an aperture 63 in the support plate 12 while the other end is anchored in an aperture 64 or 65 in the web portion of the associated brake shoe.

Assuming rotation of the brake 10 in the direction shown by the arrow in FIG. 1, then when the brakes are applied by pressurizing the motor 14, initially the toe ends of each of the brake shoes 21, 22 will be expanded outwardly into engagement with the rotating internal brake surface of drum 10 and the brake shoes 21, 22 will thereupon be urged to rotate in a counterclockwise direction, the same as that of the drum 10. The servo action tending to rotate the primary brake shoe 21 in a counterclockwise direction, resulting from engagement of brake shoe 21 with drum 10, will develop a force at the ramp 47 on anchor link 45 that is represented by the vector F (FIG. 1). The force F is normal to the ramp surface 47 and it has horizontal and vertical force components which have been represented by the vectors $F_h$ and $F_v$ respectively. The vertical component $F_v$ prevents movement of the heel portion of the primary brake shoe 21 radially inwardly along the anchor link ramp 47 and will cause radially outwardly directed movement of the heel end of the shoe as hereafter explained. Furthermore, the sliding connection between the primary shoe heel end 23 and the anchor link ramp surface 47 permits the primary shoe heel portion to move radially outwardly during braking if such movement is necessary to bring about adjustment of the shoe rim contour so that essentially total contact is obtained between the shoe rim portions and the engaged portions of the brake drum 10. In addition to the shoe adjusting action resulting from the use of sliding anchor ramps, the use of a contoured brake shoe web portion on each of the brake shoes gives a degree of flexibility in the brake shoes, lengthwise of their curvature, that causes the shoe intermediate portions to flex or "hoop" under compressive loading so that the shoe rims will match the shape of the drum portions engaged thereby even though the drum 10 may distort during a braking operation. This particular type of hooping action of the shoe resulting from use of contoured brake shoe web portion is specifically described in the aforementioned Robert F. Smith patent application Serial No. 367,023, now U.S. Patent No. 2,828,834.

While the aforedescribed braking action of the primary shoe 21 is much the same as that which would result from anchoring the heel of the primary shoe on a fixedly mounted, radially extending, anchor ramp, still, because the primary shoe anchor ramp surface 47 can move circumferentially, to a limited degree, a form of cushioning action is obtained that improves the action of the primary brake shoe 21 over that which would be obtained with the same shoe anchored to a fixedly mounted anchor ramp surface.

In addition to providing a smooth engaging, highly effective primary brake shoe 21, the anchoring of the heel of the primary shoe 21 on a circumferentially shiftable anchor link 45 provides material improvement in the effectiveness of the secondary brake shoe 22 without loss of control of the braking action. If the brake assembly shown in FIG. 1 had the secondary brake shoe 22 anchored at its heel portion on a fixed anchor ramp surface shaped like surface 48, then the secondary shoe 22 would not be self-energizing and there would not be radially outwardly directed forces acting on the shoe heel portion tending to urge the heel of the secondary shoe 22 into engagement with the brake drum 10. Accordingly, the secondary shoe 22 if anchored to a fixed ramp would not be nearly as effective for braking as the primary shoe during forward drive.

Because of the anchoring of the heel portions of each of the primary and secondary shoes 21, 22 on a shiftable anchor link 45, a vast improvement in effectiveness of the secondary brake shoe 22 can be obtained. As previously pointed out, the braking force F applied to the anchor link ramp surface 47 by the primary shoe 21 has a horizontal component $F_h$ that tends to shift the anchor link 45 circumferentially or rightwardly towards the heel of the secondary brake shoe 22. Accordingly, the ramp surface 48 on the right end of anchor link 45 is moved rightwardly during braking on forward drive and the self-energized primary brake shoe 21 transmits a portion of its self-energizing or servo action to the secondary brake shoe 22 so that the secondary shoe 22 is also a self-energized brake shoe. Movement of anchor link 45 rightwardly during braking shifts the heel portion of the secondary brake shoe 22 tangentially as well as radially outwardly towards the brake drum 10. This outward movement of the heel end of the secondary shoe 22 causes the entire braking area of the secondary shoe 22 to be brought into mating frictional engagement with surrounding brake drum 10. With each shoe now positioned for optimum braking we have truly a "total contact" brake. The fact that the anchor ramp 48 for the secondary shoe 22 is shiftable rather than fixed can have a cushioning effect that gives a smooth acting secondary brake shoe.

As noted before, the force F (FIG. 1) applied to the ramp surface 47 of the anchor link 45 during forward drive braking produces a horizontal vector $F_h$ that urges the anchor link 45 rightwardly and it also produces a vertical vector $F_v$ tending to shift the anchor link 45 downwardly or radially outwardly. The vertical vector $F_v$ urges the lower edge 46 of the anchor link 45 downwardly into frictional engagement with the top edge 37 of the spacer plate 36. Accordingly, the link 45 is not a free floating anchor link but is one the movement of which is controlled by the frictional engagament it has with the contacting portions of its supporting channel. The anchor link 45 contacts the plate edges 35, 37 and the adjacent portions of the plates 12 and 50.

One of the unique features of this improved brake design is the sliding anchor plate or link 45 which uses the friction forces between it and its supporting plates 12, 34, 36, 50 to control the amount of servo or self-energizing force transmitted from the primary shoe 21 to the secondary shoe 22. In addition, this brake design utilizes sliding contact between the shoe heel portions 23, 24 and the anchor plate ramps 47, 48 to normally maintain shoe position so as to insure a match of shoe rim shapes to the drum shape. The flexibility of the shoes, due to contoured webs, maintains drum shoe engagement during drum distortion to give a "total contact" brake. The noted self adjustment of the shoes eliminates the need for any major brake shoe adjustments other than an occasional drum clearance adjustment that can be easily effected by rotation of the notched collars 56. The angles of the ramp surfaces 47, 48 on the anchor link 45 that are slidably contacted by the shoe heel ends 23, 24 can be independently varied to give the desired balance between primary and secondary brake shoe braking force or torque.

In addition to providing a brake design that has each of the shoes self-adjusting and self-energizing, the disclosed brake design has the additional advantage of being equally effective in either forward or reverse drive. Furthermore, because of the particular design, the same brake assembly can be used for both the front and rear wheels of a vehicle and the same brake can be used on either the right or left side of the vehicle. As the primary and secondary shoes can be identical a minimum number of different brake parts are required for a vehicle installation using this type of brake and this is an important economic advantage in addition to eliminating possible sources of trouble due to errors in assembly of the brake on a vehicle. In addition to the aforenoted advantages of this type of brake, one prime advantage that must not be overlooked is the fact that this brake design provides primary and secondary brake shoes that are each self energizing and yet the built-in friction control of the shiftable anchor link 45 gives a stable, predictable brake at all times because the degree of self energization transmitted between the primary and secondary brake shoes can be controlled by the ramp angularity and by the frictional engagement between the sides of the anchor link 45 and its supporting channel structure.

I claim:

1. In a brake assembly, a support plate, a brake shoe actuating means mounted on said support plate at a first position adjacent the periphery thereof, an anchor support mounted on said support plate at a second position spaced peripherally of said plate from said shoe actuating means, said anchor support including a channel portion to slidably receive an anchor link, an anchor link slidably mounted in said anchor support channel portion for guided movement transversely of the plate in a plane parallel thereto, said anchor link having a pair of ramp surfaces formed thereon adjacent its opposite ends with the ramp surfaces arranged to converge towards the center of the support plate or the region immediately thereabove, and a pair of arcuately shaped brake shoes extending peripherally about the support plate from opposite sides of the shoe actuating means with each shoe having one end engaged with the actuating means and the other end slidably engaged with one of the anchor link ramp surfaces, said anchor support including means to frictionally engage the shiftable anchor link and control the braking force transmitted from one shoe to the other shoe through the anchor link, said last mentioned means comprising an adjustable wall portion of said anchor link support channel.

2. In a brake assembly, a support plate, a brake shoe actuating means mounted on said support plate at a first position adjacent the periphery thereof, an anchor support mounted on said support plate at a second position spaced peripherally of said plate from said shoe actuating means, said anchor support including a channel formation to slidably receive a shiftable anchor link, an anchor link slidably mounted in said anchor support portion for shiftable movement transversely of the plate in a plane parallel thereto, said anchor link having a pair of ramp surfaces formed thereon that converge towards the center of the support plate or the region immediately thereabove, and a pair of arcuately shaped brake shoes extending peripherally of the support plate from opposite sides of the shoe actuating means, said shoes each including a rim portion and a web portion with the heel end of the web portion of each shoe having portions slidably engaged with a different one of the anchor link ramp surfaces, said anchor support channel formation having portions arranged to frictionally engage said shiftable anchor link during a braking operation to partially control the braking force transmitted from one shoe to the other shoe by said anchor link, said portions of the anchor link support channel that are frictionally engageable with the anchor link being adjustably mounted on the support plate.

3. In a reversible brake assembly, a support plate, a brake shoe actuating means mounted on said support plate at a first position adjacent the periphery thereof, an anchor support mounted on said support plate at a second position spaced peripherally of said plate from said shoe actuating means, said anchor support including a channel portion having flat-sided, angularly related, bottom and side walls to slidably receive an anchor link, an anchor link having flat bottom and side walls in surface engagement with and slidably mounted in said anchor support channel portion for guided movement transversely of the plate in a plane parallel thereto, said anchor link having a pair of substantially radially directed ramp surfaces formed thereon adjacent its opposite ends with the ramp surfaces arranged to converge towards the center of the support plate at a point between the plate center and the region immediately thereabove, and a pair of arcuately shaped brake shoes extending peripherally about the support plate from opposite sides of the shoe actuating means with each shoe having one end engaged with the actuating means and the other end slidably engaged with a different one of the substantially radially directed anchor link ramp surfaces to shift radially outwardly along said ramp surface during brake application by said actuating means, said anchor support including means to frictionally engage the shiftable anchor link and control the braking force transmitted from one shoe to the other shoe through the anchor link.

4. In a brake assembly as set forth in claim 3 wherein said anchor support channel portion is built up from a plurality of assembled flat sheet metal parts.

References Cited in the file of this patent

UNITED STATES PATENTS

| | | |
|---|---|---|
| 1,693,887 | Christensen | Dec. 4, 1928 |
| 1,968,667 | White | July 31, 1934 |
| 2,348,500 | Sawtelle | May 9, 1944 |
| 2,466,425 | House et al. | Apr. 5, 1949 |
| 2,718,284 | Anderson | Sept. 20, 1955 |
| 2,740,498 | Trahern | Apr. 3, 1956 |
| 2,828,834 | Smith | Apr. 1, 1958 |

FOREIGN PATENTS

| | | |
|---|---|---|
| 775,214 | France | Oct. 8, 1934 |
| 775,896 | France | Oct. 22, 1934 |
| 1,034,998 | France | Apr. 15, 1953 |
| 654,889 | Great Britain | July 4, 1951 |